(12) United States Patent
Choi et al.

(10) Patent No.: US 9,012,349 B1
(45) Date of Patent: Apr. 21, 2015

(54) METHOD OF SYNTHESIZING BULK TRANSITION METAL CARBIDE, NITRIDE AND PHOSPHIDE CATALYSTS

(71) Applicant: UT-Battelle LLC, Oak Ridge, TN (US)

(72) Inventors: Jae Soon Choi, Knoxville, TN (US); Beth L. Armstrong, Clinton, TN (US); Viviane Schwartz, Knoxville, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 71 days.

(21) Appl. No.: 14/069,514

(22) Filed: Nov. 1, 2013

(51) Int. Cl.

| | | |
|---|---|---|
| *B01J 23/16* | (2006.01) | |
| *B01J 23/20* | (2006.01) | |
| *B01J 23/28* | (2006.01) | |
| *B01J 23/30* | (2006.01) | |
| *B01J 27/14* | (2006.01) | |
| *B01J 27/186* | (2006.01) | |
| *B01J 27/19* | (2006.01) | |
| *B01J 27/195* | (2006.01) | |
| *B01J 27/22* | (2006.01) | |
| *B01J 27/24* | (2006.01) | |
| *B01J 37/00* | (2006.01) | |
| *B01J 37/28* | (2006.01) | |
| *B01J 2/00* | (2006.01) | |

(Continued)

(52) U.S. Cl.
CPC ...................... *B01J 27/22* (2013.01)

(58) Field of Classification Search
USPC ............ 502/177, 200, 208, 210, 211; 516/88, 516/100, 101
IPC ............ B01J 23/16,23/20, 23/28, 23/30, 27/14, B01J 27/186, 27/19, 27/195, 27/22, 27/24, B01J 37/00, 37/28, 2/00, 2/02, 2/08, 13/00, B01J 13/0052, 13/0056, 13/006, 13/0069, B01J 13/0091
See application file for complete search history.

(56) References Cited

U.S. PATENT DOCUMENTS 3,779,946 A 12/1973 Dorn et al.
4,515,763 A 5/1985 Boudart et al.
(Continued)

FOREIGN PATENT DOCUMENTS

CN 1714936 1/2006
CN 102029169 4/2011
(Continued)

OTHER PUBLICATIONS

"Low-Temperature Sol-Gel Preparation of Ordered Nanoparticles of Tungsten Carbide/Oxide," Michael J. Hudson et al. Ind. Eng. Chem. Res. 2005, 44, pp. 5575-5578.*

*Primary Examiner* — Patricia L Hailey
(74) *Attorney, Agent, or Firm* — Warner Norcross & Judd LLP

(57) ABSTRACT

A method for synthesizing catalyst beads of bulk transmission metal carbides, nitrides and phosphides is provided. The method includes providing an aqueous suspension of transition metal oxide particles in a gel forming base, dropping the suspension into an aqueous solution to form a gel bead matrix, heating the bead to remove the binder, and carburizing, nitriding or phosphiding the bead to form a transition metal carbide, nitride, or phosphide catalyst bead. The method can be tuned for control of porosity, mechanical strength, and dopant content of the beads. The produced catalyst beads are catalytically active, mechanically robust, and suitable for packed-bed reactor applications. The produced catalyst beads are suitable for biomass conversion, petrochemistry, petroleum refining, electrocatalysis, and other applications.

26 Claims, 6 Drawing Sheets

(51) Int. Cl.
 *B01J 2/02* (2006.01)
 *B01J 2/08* (2006.01)
 *B01J 13/00* (2006.01)
 *B01J 27/188* (2006.01)

(56) References Cited

U.S. PATENT DOCUMENTS

| | | | |
|---|---|---|---|
| 7,518,023 B2* | 4/2009 | Geyer et al. | 585/250 |
| 7,576,027 B2 | 8/2009 | Ma et al. | |
| 2004/0220436 A1* | 11/2004 | Birke et al. | 585/270 |
| 2006/0134152 A1* | 6/2006 | Prouzet et al. | 424/401 |
| 2007/0117714 A1* | 5/2007 | Geyer et al. | 502/300 |
| 2007/0284289 A1* | 12/2007 | Rodrigues et al. | 208/209 |
| 2012/0264595 A1 | 10/2012 | Arhancet et al. | |
| 2013/0045865 A1 | 2/2013 | Thompson et al. | |

FOREIGN PATENT DOCUMENTS

| | | |
|---|---|---|
| CN | 102836702 | 12/2012 |
| CN | 101992109 | 1/2013 |
| WO | 96/03510 | 11/1996 |

* cited by examiner

METHOD OF SYNTHESIZING BULK TRANSITION METAL CARBIDE, NITRIDE AND PHOSPHIDE CATALYSTS This invention was made with government support under Contract No. DE-AC05-00OR22725 awarded by the U.S. Department of Energy. The government has certain rights in the invention.

BACKGROUND OF THE INVENTION

The present invention relates to a method of synthesizing bulk transition metal catalysts.

Carbides of transition metals such as Ti, Zr, V, Nb, Ta, Cr, Mo and W, along with their nitride and phosphide counterparts, have been recognized as catalytically active materials which could replace or substitute for existing process catalysts due to either better economics or performance. Potential applications include petroleum refining and biomass conversion. For example, research has shown that transition metal carbides, nitrides and phosphides can exhibit precious-metal-like catalytic behavior in a range of hydrocarbon conversion reactions such as hydrogenation, hydrogenolysis, and isomerization. Furthermore, under certain conditions, these materials compare favorably with CoMo or NiMo sulfides, which are a workhorse of the current petroleum refining as catalysts for hydrotreating processes which remove S, N, and O impurities from petroleum feedstock.

In most state-of-the-art catalysts used in petroleum refining and in the petrochemical industry, the active catalytic components or phases are finely dispersed on high surface area supports, for instance alumina and zeolites, to maximize the specific surface area (e.g., $m^2/g$) of the active component. Supports are typically shaped as pellets or beads before deposition of catalytically active components. This shaping of powders into beads and pellets is necessary for practical catalytic processes which are generally implemented in large-scale fixed bed reactors. In fact, charging a large amount of catalyst powders in a reactor will lead to a densely packed bed, causing an excessive pressure drop and other technical issues.

In certain applications, deploying catalytic materials without supports (i.e., use as bulk catalysts) could be more advantageous. For example, having bulk catalysts could mitigate undesired reactions which involve support sites and/or interfaces between supports and active phases, thereby minimizing the formation of unwanted byproducts or deactivation species. The bulk catalysts could be particularly interesting in the emerging field of catalytic processing of biomass-derived liquids such as pyrolysis oils (also known as bio-oils), as conventional support materials and/or interfaces between supports and active phases are not structurally stable under the hot water-rich environments involved.

It has been recently shown that bulk transition metal carbides, nitrides and phosphides can be prepared with high surface areas via a temperature programmed reaction. In this procedure, by increasing the reaction temperature slowly and in a controlled manner in a flow of reducing gas mixture (e.g., $CH_4/H_2$ in the case of carburization), transition metal oxides are transformed to high surface area carbides, nitrides and phosphides. These materials are therefore an attractive candidate as bulk catalysts if they can be prepared in shapes adequate for practical applications (e.g., beads, pellets). Metal carbides are hard and refractory materials, which makes it difficult to shape carbides without losing attractive catalytic properties such as surface area (e.g., by high temperature sintering). There has been no known industrial application of shaped bulk carbide, nitride, or phosphide catalysts, but some methods have been proposed which involve activation of extruded metal oxide precursors (e.g., carburization or nitridation of Nb, Mo, W oxides). These prior art processes involve multiple steps to obtain bulk carbide and nitride pellets. First, acid forms of transition metals need to be prepared. The prepared metal acid powders are then mixed with celluloses, and the resulting mixture is peptized. The peptized product is extruded with an extruder. Following thermal treatments transform the transition metal acids to oxides, burn out cellulose, and increase mechanical strength of pellets. The temperature programmed carburization or nitridation of the pellets leads to high surface area bulk carbides and nitrides. So far the application of these prior-art processes has been limited to Mo, W, and Nb carbides and nitrides.

SUMMARY OF THE INVENTION

A method for synthesizing beads (or pellets) of bulk transition metal carbides, nitrides and phosphides is provided. The method includes providing a water-based slurry including transition metal oxide particles and binders, dropping or pipetting the oxide slurry into a salt solution to form oxide beads having a dispersion of metal oxide particles, rinsing and drying the prepared oxide beads, heat treating first in air to remove the binder and strengthen the bead, and subsequently heat treating the prepared oxide beads in a carburizing gas, a nitriding gas, or a phosphiding gas to form transition metal catalyst beads. The resulting transition metal catalyst beads are catalytically active, mechanically robust, and suitable for packed-bed reactor applications. The transition metal catalyst beads are suitable for biomass conversion, petrochemistry, petroleum refining, electrocatalysis, and other applications.

In one embodiment, the method includes suspending a transition metal oxide powder in a solution of sodium alginate to form a slurry. The slurry is dropped in an aqueous solution including calcium chloride, cobalt chloride, nickel chloride, copper chloride, or other metal chlorides to form a prepared oxide bead. The prepared oxide bead is separated from the aqueous solution, rinsed, and dried. The prepared oxide bead is then heat treated in air to remove the binder and strengthen the bead and subsequently in a temperature programmed reaction in the presence of a carburizing gas to form a transition metal carbide bead.

In another embodiment, the prepared oxide bead is heat treated in the presence of a nitriding gas to form a transition metal nitride bead. In still another embodiment, the prepared oxide bead is heat treated in the presence of a phosphiding gas to form a transition metal phosphide bead. Variables that control the bead size, bead porosity, and bead mechanical strength include the concentration of the alginate, the molecular weight of the alginate, the concentration of the chloride solution, the time the beads are submerged in the chloride solution, the heat treating conditions, and the amount of metal oxide powder. The method of the present invention is suitable for essentially any transition metal oxide, including for example $MoO_3$, $Nb_2O_5$, and $WO_3$. Physical mixtures of different metal oxides can also be used to form oxide beads.

The present invention therefore provides a water-based method to synthesize beads of essentially any kind of bulk transition metal oxide without needing a metal acid synthesis or an extrusion step. In addition to the sodium alginate binders and metal chloride salts mentioned above, any ionic gelling polysaccharides/divalent salt combinations should work for gelling (or bead formation) processes. Examples of polysaccharides include pectin, xanthan gum, carrageenan and gellan (monovalent cations work best with carrageenan and gellan). Chitin or chitosan can also be used, but instead of a salt, one needs to use pH changes to drive gelling processes.

Activation (e.g., carburization, nitridation, phosphidation) of prepared oxide beads leads to bulk carbide, nitride, and phosphide catalyst beads with good catalytic performance and mechanical strength. In addition to the broad applicability of the present method, the method allows control of bead porosity, mechanical strength, and dopant incorporation, wherein the dopants are metals remaining in the metal catalyst beads from the chloride solution (e.g., Ni from $NiCl_2$, Co from $CoCl_2$, etc.).

These and other features and advantages of the present invention will become apparent from the following description of the invention, when viewed in accordance with the accompanying drawings and appended claims.

DETAILED DESCRIPTION OF THE CURRENT EMBODIMENTS

The invention as contemplated and disclosed herein includes a method for synthesizing beads (or pellets) of bulk transition metal carbides, nitrides and phosphides. As set forth more fully below, the method involves the activation of oxide beads via temperature programmed carburization, nitridation or phosphidation, resulting in catalyst beads that are catalytically active and mechanically robust, and that expand potential industrial application of transition metal catalyst materials as unsupported bulk catalysts.

Figure 1:
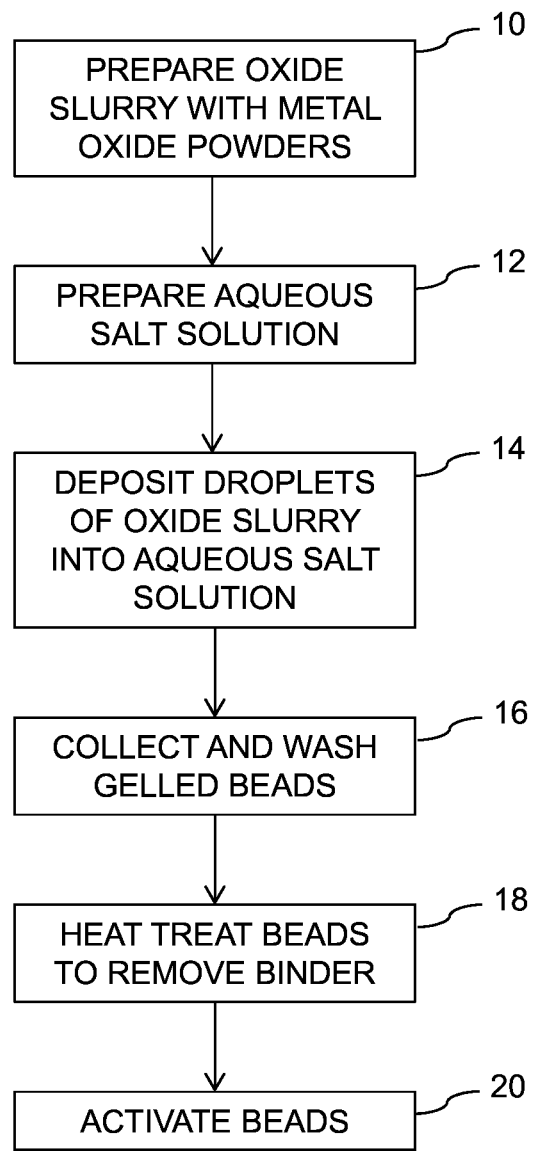
FIG. 1 is a flow chart illustrating bead formation in accordance with an embodiment of the present invention.

Referring now to FIG. 1, a flow chart illustrating transition metal catalyst bead formation is presented. In general terms, a method for preparing transition metal catalyst beads in accordance with one embodiment can include the following steps or stages: a) forming an oxide slurry, b) preparing a an aqueous salt solution, c) dropping or pipetting the oxide slurry into the aqueous salt solution, d) collecting, washing and/or drying oxide beads from the aqueous salt solution, e) heat treating the oxide beads to remove the binder, and f) activating the oxide beads through temperature programmed carburization, nitridation or phosphidation to transform the oxide beads into carbide, nitride, or phosphide transition metal catalysts. As used herein, "bead" and "beads" refers to beads, pellets, granules and other dimensionally stable masses, including those that are spherical, non-spherical, porous, non-porous, solid, and hollow.

Forming the oxide slurry is depicted as step 10 in FIG. 1. The oxide slurry includes a binder solution that is used as the base system for a metal oxide powder. The binder solution can include any gelling polysaccharides, and includes sodium alginate in the present embodiment. The metal oxide powder is water insoluble, and is suspended in the sodium alginate. Example metal oxide powders include $MoO_3$, $Nb_2O_5$, and $WO_3$. These metal oxides are exemplary, as essentially any water soluble transition metal oxide (and mixtures thereof) can be utilized, including for example, $TiO_2$ or $ZrO_2$. Other transition metals forming oxides include Sc, Ti, V, Cr, Mn, Fe, Co, Ni, Y, Zr, Nb, Mo, Tc, La, Hf, Ta, W, Re, Os, and combinations thereof. In addition, the concentration and molecular weight of alginate are variable, and varying the concentration and molecular weight of the alginate influences the bead size, bead porosity, and bead mechanical strength of the finished catalyst beads. Chitin and/or chitosan can also be included in a gel forming base, and subsequently dropped into an aqueous solution at a specific pH (instead of an aqueous salt solution) to drive the gelling process described below.

Preparing the aqueous salt solution is depicted as step 12 in FIG. 1. The aqueous salt solution can include any monovalent and di-valent metal salt, and includes a dilute solution of $CaCl_2$ in the present embodiment. In other embodiments the aqueous sale solution includes other water soluble chlorides with appropriate valence states. For example, the aqueous salt solution can include $CoCl_2$, $NiCl_2$ or $CuCl_2$. Contrary to Ca, many other elements can decrease the activation temperature (i.e., facilitating reduction and incorporation of carbon, nitrogen or phosphorous), enabling lower temperature synthesis with higher specific surface areas. In addition, some metals are known catalyst dopants or promoters, enhancing catalytic performance of carbides, nitrides and phosphides. Accordingly, increasing the amount of unreacted $CoCl_2$, $NiCl_2$ or $CuCl_2$ can fine tune the catalytic performance of the resulting carbide, nitride, or phosphide beads. Employing water insoluble metal oxides containing heteroatoms such as phosphorous can also control the activation process as well as the properties of the synthesized carbide, nitride, and phosphide beads.

Dropping the oxide slurry into the chloride solution is depicted as step 14. In the present embodiment, the oxide slurry is pipetted into the dilute solution of a metal chloride such as $CaCl_2$. Each droplet, when submerged in the metal chloride solution, forms a gel, essentially setting the droplet into a bead. In particular, the sodium ions in the binder solution exchange with the calcium ions in the chloride solution, and the alginate chains become cross-linked. The resulting oxide beads are then removed from the chloride solution at step 16 to eliminate excess moisture from the bead. For example, the beads are generally sieved or filtered out of the chloride solution, rinsed repeatedly in deionized water to remove residual salts that may be present on the bead surfaces, and dried at room temperature. After the beads are dry, they can be heat-treated or sintered in air to remove the binder and further enhance the mechanical strength of the oxide beads (depicted as step 18 in FIG. 1).

Figure 2:
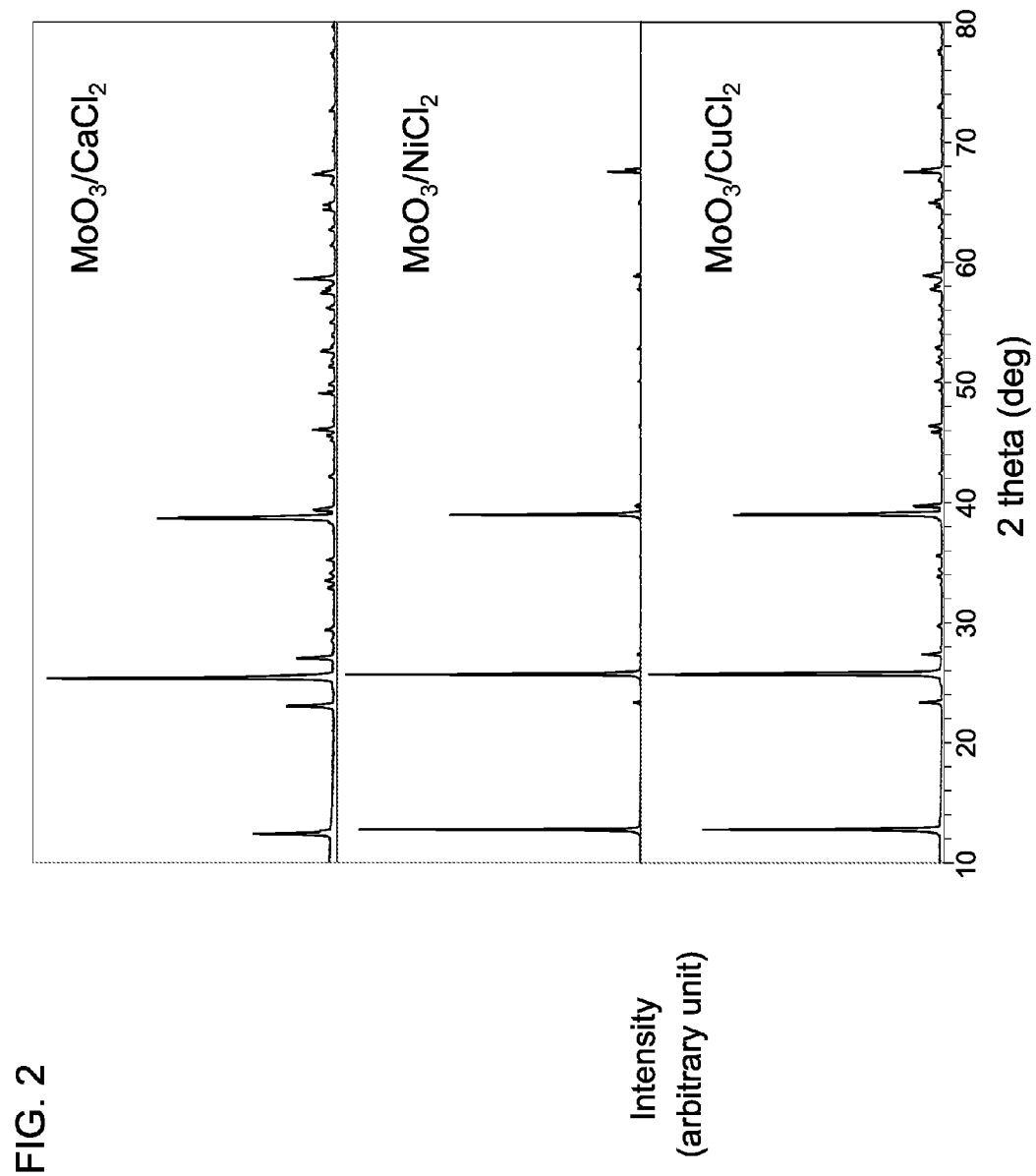
FIG. 2 includes X-ray diffraction patterns of $MoO_3$ beads prepared at different gelation conditions.
Figure 3:
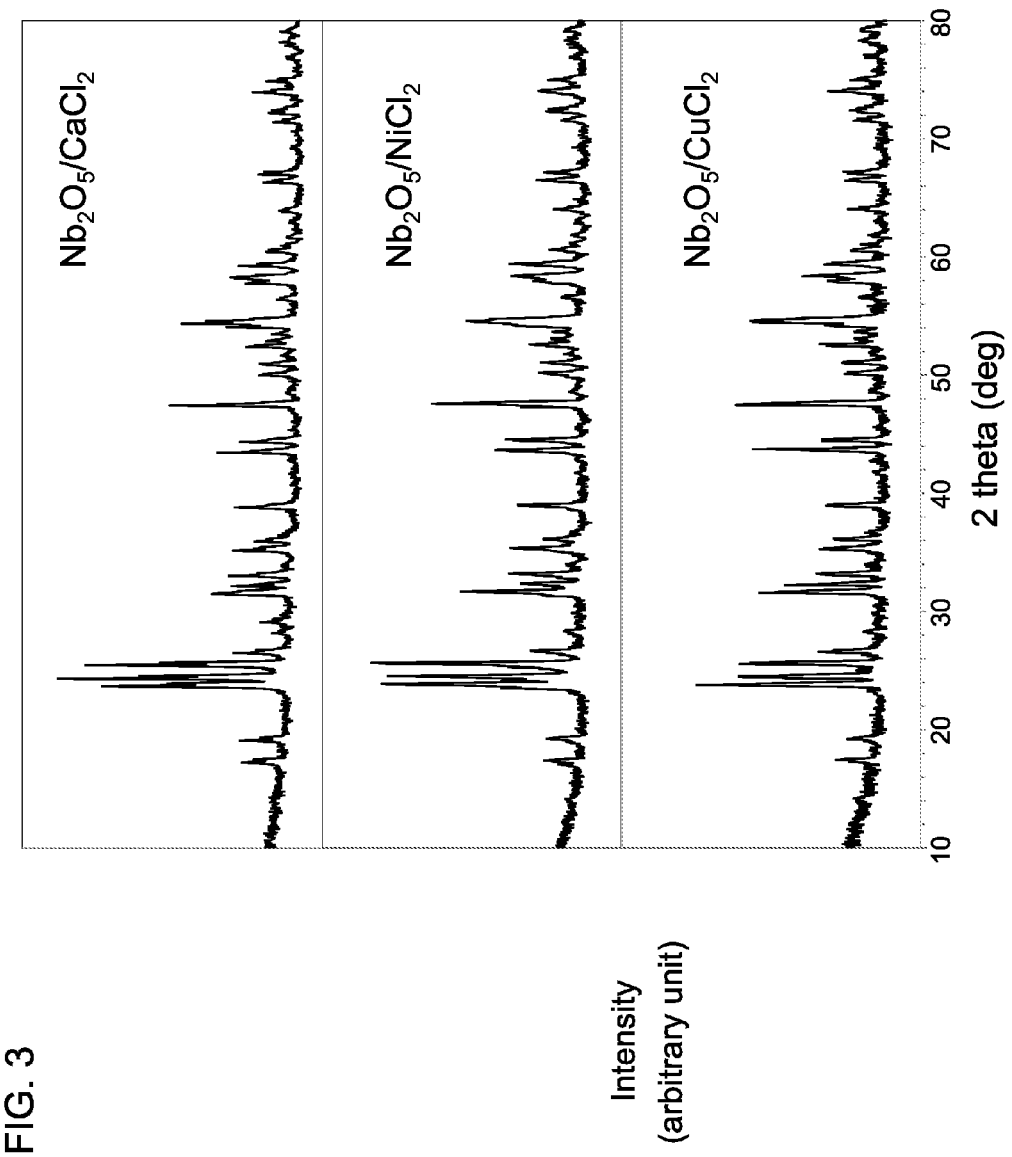
FIG. 3 includes X-ray diffraction patterns of $Nb_2O_5$ beads prepared at different gelation conditions.
Figure 4:
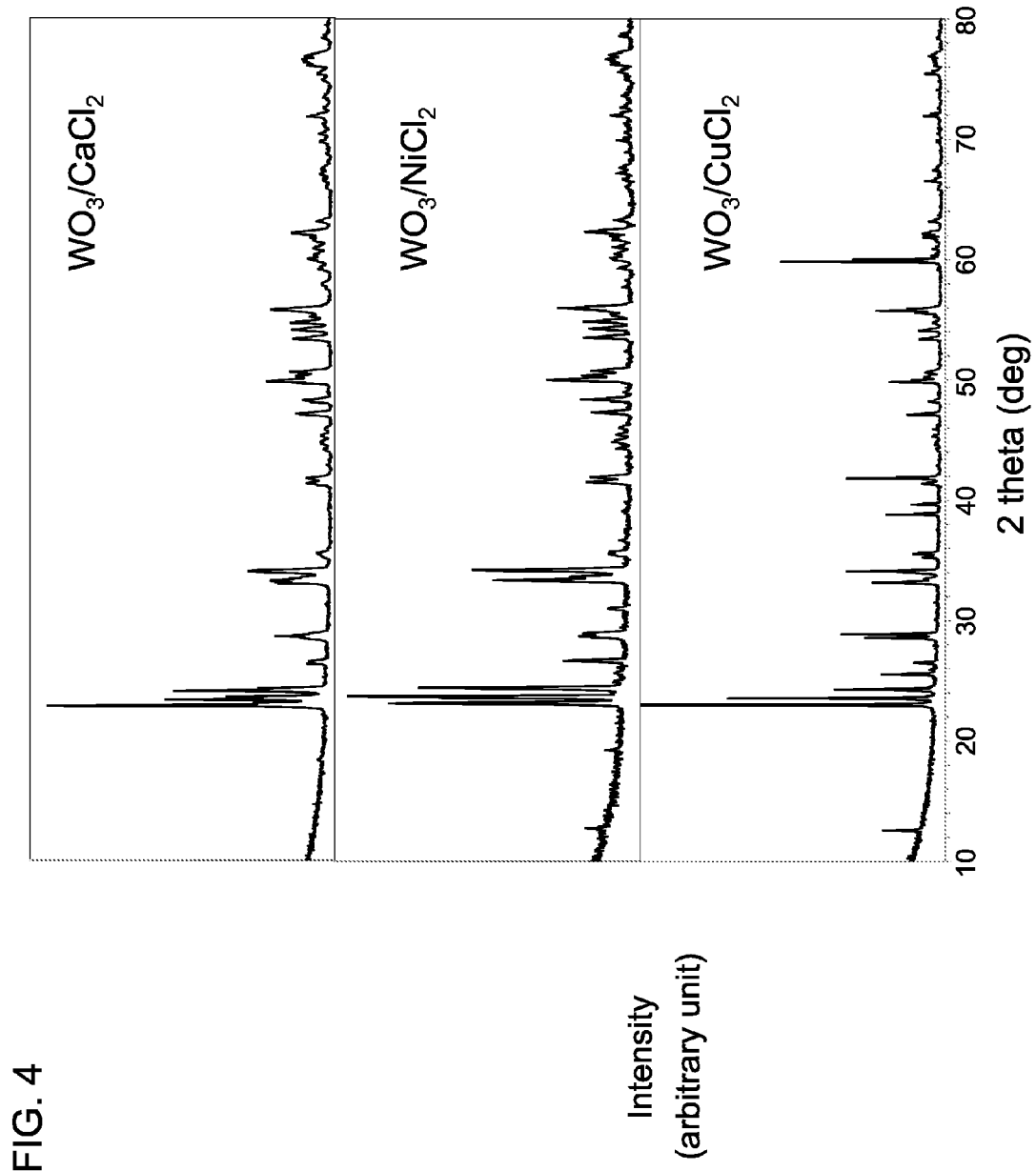
FIG. 4 includes X-ray diffraction patterns of $WO_3$ beads prepared at different gelation conditions.

As shown in FIGS. 2-4, X-ray diffraction patterns of $MoO_3$ beads, $Nb_2O_5$ beads, and $WO_3$ beads prepared at different gelation conditions are depicted. In particular, X-ray diffraction patterns are depicted in FIG. 2 for $MoO_3$ beads prepared using a CaC1 chloride solution, $MoO_3$ beads prepared using a $NiCl_2$ chloride solution, and $MoO_3$ beads prepared using a $CuCl_2$ chloride solution. As shown in FIG. 3, X-ray diffraction patterns are depicted for $Nb_2O_5$ beads prepared at three different gelation conditions including a $CaCl_2$ chloride solution, a $NiCl_2$ chloride solution and a $CuCl_2$ chloride solution. Lastly, FIG. 4 includes X-ray diffraction patterns for $WO_3$ beads prepared at three different gelation conditions, including a CaCl$_2$ chloride solution, a NiCl$_2$ chloride solution and a CuCl$_2$ chloride solution. Variables that can control oxide bead size, porosity, and mechanical strength include the concentration and molecular weight of the alginate, the amount of oxide powder, the concentration of the metal chloride solutions, the duration of the gelling time (i.e., the time the beads is submerged in the chloride solution), and the sintering conditions.

Figure 5:
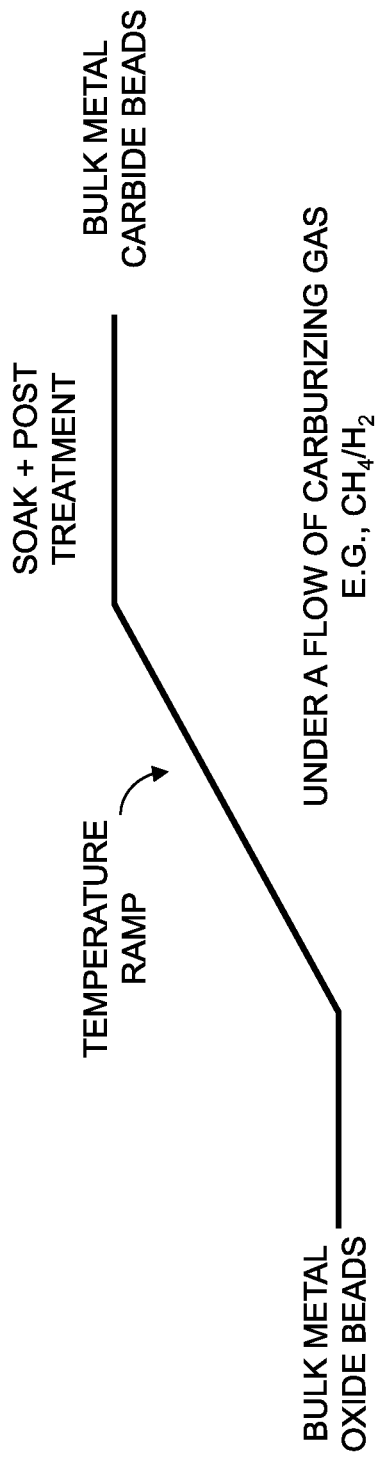
FIG. 5 is a schematic representation of bulk metal oxide beads undergoing activation under a flow of carburizing gas to form bulk metal carbide beads.

Activating the prepared oxide beads is depicted as step 20 in FIG. 1. Transformation of the prepared oxide beads into catalytically active bulk carbide, nitride, and phosphide beads is effected by temperature programmed activation. The temperature programmed activation includes increasing the temperature slowly and in a controlled manner in a flow of a reducing gas mixture within a reactor. For carburization, the reducing gas mixture includes a carburizing gas mixture, for example CH$_4$, CO, C$_2$H$_6$, other light hydrocarbons and combinations thereof, in H$_2$ gas. For nitriding, the reducing gas mixture includes a nitriding gas mixture, for example NH$_3$ in H$_2$ gas. For phosphiding, the reducing gas mixture includes a phosphiding gas mixture, for example PH$_3$ in H$_2$ gas. As shown in FIG. 5, for example, the reaction temperature gradually increases and in a controlled manner. In particular, the reactor temperature is linearly raised at a constant rate from room temperature until reaching the desired temperature, and then remaining at this temperature for an isothermal period. For example, the ramping rate can be about 1° C./min in some embodiments, while in other embodiments the ramping rate can be about 5° C./min. At the conclusion of the isothermal temperature, the reactor temperature decreases to room temperature. The resulting bulk metal carbide beads can be subject to post-activation treatments as also depicted in FIG. 5. It is to note that the activated carbide, nitride, and phosphide catalysts are highly active and can be pyrophoric. Therefore after the activation step, the catalyst beads need to be passivated for example by treating them at room temperature in an inert gas flow with low O$_2$ content before exposure to ambient air.

Though the reaction temperature is described above as increasing at a constant rate to the desired temperature, the reaction temperature can increase according to other temperature profiles as desired. For example, the activation (e.g., carburization) of the prepared oxide bead can include several intermediate soak temperatures and/or ramping rates. Further by example, the activation of the prepared oxide bead can include a ramping rate of 5° C./min from room temperature to 300° C. and then 1° C./min from 300° C. to 700° C. Isothermal activation is also possible, in which the activation temperature remains substantially constant.

Figure 6:
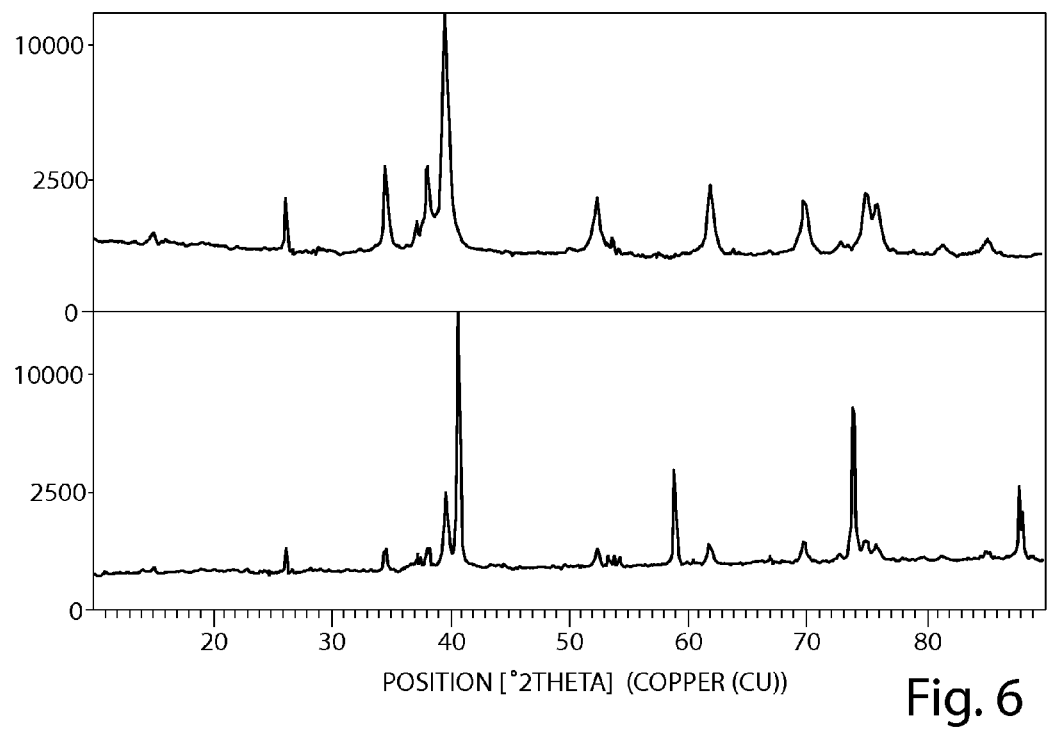
FIG. 6 includes X-ray diffraction patterns of $Mo_2C$ beads obtained by temperature programmed carburization of $MoO_3$ beads contaminated by unreacted Ca.
Figure 7:
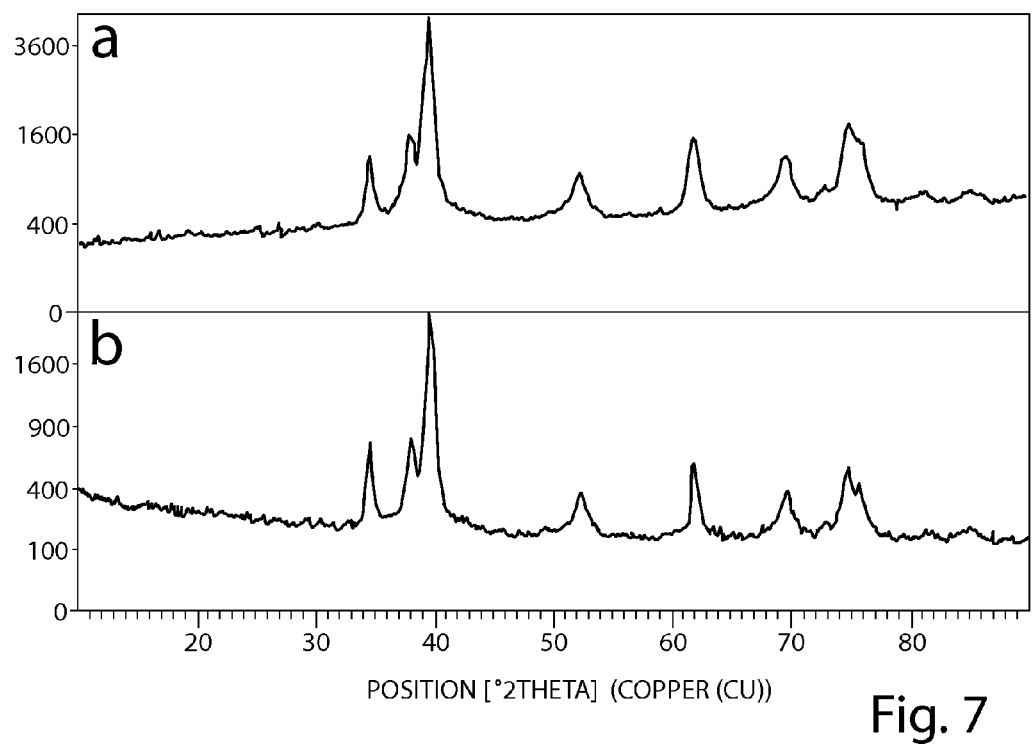
FIG. 7 includes X-ray diffraction patterns of $Mo_2C$ beads obtained by temperature programmed carburization of $MoO_3$ beads free of unreacted $CaCl_2$.

One aspect of the present method includes the minimization of Ca residues during the oxide shaping step. In particular, alkali metals can prevent or delay the activation of transition metals, resulting in an incomplete carburization or nitridation, for example. For instance, carburization of Ca-contaminated MoO$_3$ beads can lead to a mixture of Mo carbides, Mo metal and Mo oxides, which are not effective catalysts. As shown in FIG. 6, X-ray diffraction of the transition metal beads confirmed the presence of Mo metal and Mo oxides. In addition, Mo$_2$C was confirmed as present, related to the presence of Ca ions that were not completely removed from metal oxide beads prior to temperature programmed carburization. Although leaving some Ca ions is inevitable since cross-linking alginate requires them, by thoroughly removing unreacted CaCl$_2$, clean carbides, nitrides and phosphide phases can be obtained. In FIG. 7 for example, MoO$_3$ beads were prepared using a NiCl$_2$ solution (graph-a) or a CaCl$_2$ solution (graph-b) and activated by temperature programmed carburization with a minimal contamination of the MoO$_3$ beads with Ca residues (graph-b). The X-ray diffraction of the transition metal carbide illustrates that only the Mo$_2$C phases are visible.

The above embodiment therefore provides a method to prepare catalyst beads of bulk transition metal carbides, nitrides, and phosphides. The bulk transition metal catalysts can include, for example, molybdenum carbide, molybdenum nitride, molybdenum phosphide, tungsten carbide, tungsten nitride, or tungsten phosphide. Other bulk metal carbides, nitrides, or phosphides can be synthesized as desired. The above method can be tuned for the control of porosity, mechanical strengths, and dopant content of beads. In addition, dopant elements can be incorporated during oxide bead shaping; Ni can, for example be incorporated by using NiCl$_2$ to prepare metal salt solution. Activation of as-prepared oxide beads via temperature programmed carburization, nitridation, and phosphidation can result in bulk metal carbide, nitride, and phosphide catalysts beads, respectively. As bulk catalysts, the beads can be used in packed-bed reactor applications, for instance for biomass conversion, petroleum refining, and other applications.

EXAMPLE 1

Mo$_2$C transition metal beads were synthesized according to the following example, which is intended to be non-limiting.

An oxide slurry was obtained by suspending 50 wt % of molybdenum oxide in an alginate solution made from a 1 to 1 ratio of 5 wt % low molecular weight alginate and 1 wt % high molecular weight alginate. The oxide slurry was pipetted into a 2 wt % calcium chloride solution at room temperature. The mixture was allowed to stand for 2 to 30 minutes to allow the oxide slurry to solidify, during which time sodium ions in the oxide slurry exchange with calcium ions in the chloride solution. Molybdenum oxide beads were removed from the calcium chloride solution, rinsed in deionized water, and dried in air at room temperature for 24 hours. The oxide beads were then heat treated at 600° C. for 2 hours in air to remove any residual binder solution and to enhance the mechanical strength of the oxide beads. The oxide beads were then transferred to a reactor and activated according to a temperature programmed carburization method. In particular, the temperature of reactor was increased from room temperature in a linear rate of 1° C. per minute to 700° C., and remaining at this temperature for 1 hour, all while under a flow of CH$_4$/H$_2$ gas at approximately 100 mL/minute per gram of oxide with a mixture ratio of 15% CH$_4$ in H$_2$. The beads were then cooled to room temperature in an inert gas flow and were passivated in a low concentration of O$_2$ in an inert gas flow for at least 10 hours before exposing to air. The resulting Mo$_2$C transition metal beads demonstrated hexagonal close packed crystallography, having desirable surface area and site density.

EXAMPLE 2

Mo$_2$C transition metal beads were synthesized according to the following example, which is intended to be non-limiting.

An oxide slurry was obtained by suspending 50 wt % of molybdenum oxide in an alginate solution made from a 1 to 1 ratio of 5 wt % low molecular weight alginate and 1 wt % high molecular weight alginate. The oxide slurry was pipetted into a 2 wt % nickel chloride solution at room temperature. The mixture was allowed to stand for 2 to 30 minutes to allow the oxide slurry to solidify, during which time sodium ions in the oxide slurry exchange with nickel ions in the chloride solution. Molybdenum oxide beads were removed from the nickel chloride solution, rinsed in deionized water, and dried in air at room temperature for 24 hours. The oxide beads were then heat treated at 600° C. for 2 hours in air to remove any residual binder solution and to enhance the mechanical strength of the oxide beads. The oxide beads were then transferred to a reactor and activated according to a temperature programmed carburization method. In particular, the temperature of reactor was increased from room temperature in a linear rate of 1° C. per minute to 700° C., and remaining at this temperature for 1 hour, all while under a flow of $CH_4/H_2$ gas at approximately 100 mL/minute per gram of oxide with a mixture ratio of 15% $CH_4$ in $H_2$. The beads were then cooled to room temperature in an inert gas flow and were passivated in a low concentration of $O_2$ in an inert gas flow for at least 10 hours before exposing to air. The resulting $Mo_2C$ transition metal beads demonstrated hexagonal close packed crystallography, having desirable surface area and site density.

EXAMPLE 3

WC transition metal beads were synthesized according to the following example, which is intended to be non-limiting.

An oxide slurry was obtained by suspending 50 wt % of tungsten oxide in an alginate solution made from 1 wt % high molecular weight alginate. The oxide slurry was pipetted into a 2 wt % copper chloride solution at room temperature. The mixture was allowed to stand for 2 to 30 minutes to allow the oxide slurry to solidify, during which time sodium ions in the oxide slurry exchange with copper ions in the chloride solution. Tungsten oxide beads were removed from the copper chloride solution, rinsed in deionized water, and dried in air at room temperature for 24 hours. The oxide beads where then sintered at 1000° C. for 2 hours in air to remove any residual binder solution and to enhance the mechanical strength of the oxide beads. The oxide beads were then transferred to a reactor and activated according to temperature programmed carburization. In particular, the temperature of reactor was increased from room temperature in a linear rate of 20° C. per minute to 827° C., and remaining at this temperature for 6 hours all while under a flow of $CH_4/H_2$ gas at approximately 100 mL/minute per gram of oxide with a mixture ratio of 80% $CH_4$ in $H_2$. The temperature was then lowered to 700° C. in an inert gas for an $H_2$ treatment for 2 hours to remove polymeric carbon deposited on the surface. The carbide beads were subsequently cooled to room temperature in an inert gas flow and were passivated in a low concentration of $O_2$ in an inert gas flow for at least 10 hours before exposing to air. The resulting WC transition metal beads demonstrated simple hexagonal crystallography, having desirable surface area and site density.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method of making a catalyst bead comprising:
   providing an aqueous suspension of transition metal oxide particles in a gel-forming base having a binder;
   dropping the suspension into an aqueous salt solution to form a gel bead matrix having therein a dispersion of metal oxide particles;
   heat-treating the gel bead matrix to remove the binder and strengthen the gel bead matrix; and
   forming at least one of a transition metal carbide bead, a transition metal nitride bead, and a transition metal phosphide catalyst bead by carburizing, nitriding, or phosphiding the gel bead matrix, respectively.

2. The method according to claim 1 wherein the transition metal oxide particles are selected from the group consisting of molybdenum oxide, tungsten oxide, niobium oxide and mixtures thereof.

3. The method according to claim 1 wherein the gel-forming base includes at least one of sodium alginate, pectin, xanthan gum, carrageenan and gellan.

4. The method according to claim 1 wherein the aqueous salt solution includes at least one of $CaCl_2$, $CoCl_2$, $NiCl_2$, and $CuCl_2$.

5. The method according to claim 1 wherein the aqueous salt solution comprises divalent metal salts.

6. The method according to claim 1 wherein the aqueous salt solution comprises monovalent metal salts.

7. The method according to claim 1 wherein carburizing, nitriding or phosphiding the gel bead matrix includes ramping the temperature of the gel bead matrix in the presence of a carburizing gas, a nitriding gas, or a phosphiding gas.

8. The method according to claim 1 wherein carburizing, nitriding or phosphiding the gel bead matrix includes incrementally raising the temperature of the gel bead matrix in the presence of a carburizing gas, a nitriding gas, or a phosphiding gas.

9. The method according to claim 1 further including rinsing the gel bead matrix in deionized water and drying the gel bead matrix substantially at room temperature.

10. A method of making a catalyst bead comprising:
    suspending a metal oxide powder in a binder solution of sodium alginate to form an oxide slurry;
    dropping the oxide slurry in an aqueous solution including at least one of calcium chloride, cobalt chloride, nickel chloride and copper chloride to form a prepared oxide bead;
    removing the prepared oxide bead from the aqueous solution and heating the prepared oxide bead to remove at least a portion of the binder and strengthen the prepared oxide bead; and
    activating the prepared oxide bead in the presence of at least one of carbon, nitrogen, and phosphor to form a transition metal catalyst bead.

11. The method according to claim 10 wherein activating the prepared oxide bead includes heating the prepared oxide bead under a flow of a reducing gas and a carbon source.

12. The method according to claim 10 wherein activating the prepared oxide bead includes heating the prepared oxide bead under a flow of a reducing gas and a nitrogen source.

13. The method according to claim 10 wherein activating the prepared oxide bead includes heating the prepared oxide bead under a reducing gas and a phosphorus source.

14. The method according to claim 10 wherein removing the prepared oxide bead from the aqueous solution includes rinsing the prepared oxide bead in deionized water and drying the prepared oxide bead substantially at room temperature.

15. The method according to claim 10 wherein activating the prepared oxide bead includes linearly increasing the temperature of the prepared oxide bead.

16. The method according to claim 10 wherein activating the prepared oxide bead includes incrementally raising the temperature of the prepared oxide bead.

17. A method of making a transition metal catalyst comprising:
- providing an aqueous suspension of transition metal oxide particles in a gel-forming base;
- submerging the aqueous suspension within an aqueous solution including at least one of calcium chloride, cobalt chloride, nickel chloride and copper chloride to form a prepared oxide bead having therein a dispersion of metal oxide particles;
- removing the prepared oxide bead from the aqueous solution and rinsing the prepared oxide bead to remove at least a portion of the binder;
- heat-treating the prepared oxide bead to remove the binder and strengthen the prepared oxide bead; and
- inserting the prepared oxide bead in a temperature-programmed reactor with a flow of a gas selected from the group consisting of a carburizing gas, a nitriding gas, and a phosphiding gas and increasing the temperature of the reactor to convert the metal oxide particles into metal carbides, metal nitrides, or metal phosphides, respectively.

18. The method according to claim 17 wherein the gel-forming base includes sodium alginate.

19. The method according to claim 17 wherein increasing the temperature of the reactor includes linearly increasing the temperature of the reactor.

20. The method according to claim 17 wherein increasing the temperature of the reactor includes incrementally raising the temperature of the reactor.

21. The method according to claim 17 further including drying the prepared oxide bead substantially at room temperature.

22. The method according to claim 17 wherein the aqueous suspension includes a catalyst dopant.

23. The method according to claim 22 wherein the catalyst dopant includes phosphorus.

24. A method of making a transition metal catalyst comprising:
- providing an aqueous suspension of transition metal oxide particles in a gel-forming base;
- dropping the suspension into an aqueous solution at a specific pH to form a prepared oxide bead therein including a dispersion of metal oxide particles;
- removing the prepared oxide bead from the aqueous solution and rinsing the prepared oxide bead to remove at least a portion of the binder;
- heat-treating the prepared oxide bead to remove the binder and strengthen the prepared oxide bead; and
- forming at least one of a transition metal carbide bead, a transition metal nitride bead, and a transition metal phosphide catalyst bead by carburizing, nitriding, or phosphiding the prepared oxide bead, respectively.

25. The method according to claim 24 wherein the gel-forming base includes chitin.

26. The method according to claim 24 wherein the gel-forming base includes chitosan.

* * * * *

UNITED STATES PATENT AND TRADEMARK OFFICE
CERTIFICATE OF CORRECTION

| | | |
|---|---|---|
| PATENT NO. | : 9,012,349 B1 | Page 1 of 1 |
| APPLICATION NO. | : 14/069514 | |
| DATED | : April 21, 2015 | |
| INVENTOR(S) | : Jae Soon Choi et al. | |

It is certified that error appears in the above-identified patent and that said Letters Patent is hereby corrected as shown below:

Title Page, Item (57) ABSTRACT, line 1:

"A method for synthesizing catalyst beads of bulk transmission"

should be

-- A method for synthesizing catalyst beads of bulk transition --

Signed and Sealed this
First Day of September, 2015

Michelle K. Lee
*Director of the United States Patent and Trademark Office*